(12) United States Patent
Roth et al.

(10) Patent No.: US 7,783,803 B2
(45) Date of Patent: Aug. 24, 2010

(54) PAIRING SERVICE TECHNOLOGIES

(75) Inventors: David J. Roth, Redmond, WA (US);
Daniel J. Driscoll, Bellevue, WA (US);
Huseyin G. Gok, Redmond, WA (US);
Douglas Brubacher, Sammamish, WA (US);
Daniel L. Conti, Seattle, WA (US);
Yatharth Gupta, Bellevue, WA (US);
David A. Roberts, Redmond, WA (US);
Narasimha Rao S. S. Nagampalli, Redmond, WA (US);
Jeffrey T. Smith, Redmond, WA (US);
Ashraf M. Hamad, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 170 days.

(21) Appl. No.: 12/264,130

(22) Filed: Nov. 3, 2008

(65) Prior Publication Data

US 2010/0115146 A1    May 6, 2010

(51) Int. Cl.
*G06F 13/42* (2006.01)
*G06F 15/16* (2006.01)
(52) U.S. Cl. .................. 710/106; 709/227; 455/41.3
(58) Field of Classification Search ......... 710/105–116; 709/224–230; 455/41.2–41.3; 370/310; 713/180
See application file for complete search history.

(56) References Cited

U.S. PATENT DOCUMENTS

| 7,130,585 | B1  | 10/2006 | Ollis |
| 7,165,104 | B2  | 1/2007  | Wang |
| 7,707,426 | B2* | 4/2010  | Lauter et al. ................. 713/180 |
| 2005/0108369 | A1 | 5/2005 | Sather |
| 2006/0083187 | A1* | 4/2006 | Dekel .......................... 370/310 |
| 2006/0129800 | A1* | 6/2006 | Lauter et al. ................ 713/151 |
| 2007/0067446 | A1 | 3/2007 | Jones |
| 2009/0240814 | A1* | 9/2009 | Brubacher et al. .......... 709/227 |
| 2009/0286479 | A1* | 11/2009 | Thoresson et al. ......... 455/41.3 |

OTHER PUBLICATIONS

"Manage Engine WiFi Manager Datasheet", Retrieved from <http://manageengine.adventnet.com/products/wifi-manager/datasheet.html>, 3 pages.
"The Emerging Broadband Environment and Implications for the User Experience", Retrieved from <http://www.library.cmu.edu/Libraries/DiMaso_101205.ppt>, 17 pages.
"Introduction to IMS", Retrieved from<http://www.ericsson.com/technology/whitepapers/8123_Intro_to_ims_a.pdf>, 22 pages.

(Continued)

*Primary Examiner*—Christopher B Shin

(57) ABSTRACT

Pairing service technologies is described. In embodiment(s), peripheral devices can be discovered, such as by a computer device, and a peripheral device can be configured with multiple services that each correspond to one or more data communication protocols. The multiple services of the peripheral device can be determined, and a pairing sequence can be prioritized for the multiple services. The data communication protocol(s) can then be paired according to the pairing sequence to configure the multiple services of the peripheral device.

20 Claims, 3 Drawing Sheets

OTHER PUBLICATIONS

"The Windows Shell: A User's Perspective", Retrieved from <http://msdn.microsoft.com/en-us/library/bb756944.aspx>, 3 pages.
"Redefining the Quad IPTV and IMS Play with", Retrieved from <http://www.iec.org/newsletter/may07_3/analyst_corner.pdf>, 7 pages.
"Yamaha 01v96 VCM", Retrieved form <http://www.playback-europe.com/yamaha-01v96_v2-2958.html>, 3 pages.
"A New High Point in Digital Live Sound", Retrieved from <http://www.yamahaproaudio.com/downloads/brochures/mixers/pm5dv2_brochure.pdf>, 14 pages.

* cited by examiner

PAIRING SERVICE TECHNOLOGIES

BACKGROUND

A peripheral device or computer device that is communicatively linked to another computer device can be implemented for data communication via more than one wired and/or wireless communication protocol, such as via USB, TCP/IP, BLUETOOTH, Wi-Fi, and the like. A peripheral device, such as a printer, a data phone, or another computer device can be implemented to layer data communication protocols for different service technologies within the device, typically because one may be dependent on another. For example a network printer service can be dependent on a networking stack component, and before a computer device can interact with a component at the top of the layered component stack, all of the components need to be configured, provisioned, and operational.

Connecting a peripheral device to a computer device using a single data communication protocol and/or communication link is typically straightforward. The computer device can first recognize or discover the peripheral device, and then the communication link between the peripheral device and computer is configured. The communication link can be configured by optionally exchanging security credentials, provisioning the device with settings, and/or persisting information about the communication link. Some peripheral devices, however, can include multiple communication protocols and/or communication link technologies.

In some implementations, the different communication link technologies are implemented in parallel such that each transport can independently communicate data. For example, a peripheral device can implement both a USB and a BLUETOOTH communication link, and both can be used to communicate data and transfer files. In other implementations, different communication link technologies are stacked vertically (e.g., in series as stacked transports) and may be needed for a computer device to utilize the peripheral device. Access to the functionality of a peripheral device may be enabled by the use or dependence on vertically stacked technologies, and this may include a simplified configuration or additional functions of a device. For example, a wireless printer can include a Wi-Fi communication link, utilize WLAN Protected Setup (WPS) for discovery and configuration of WLAN settings, and implement a print configuration for discovery and configuration of printer settings (e.g., when printing a document utilizes both Wi-Fi and the print configuration).

For peripheral devices that are implemented to utilize stacked transports, a user may need to understand and manage the complex relationships between the various communication link technologies that a device employs, and ensure that the communication link technologies are properly configured. The user may also need to execute different process flows to discover and configure the different communication link technologies of a peripheral device. Further, it may not be clear to a user as to which components need to be configured and/or how to configure them.

SUMMARY

This summary is provided to introduce simplified concepts of pairing service technologies. The simplified concepts are further described below in the Detailed Description. This summary is not intended to identify essential features of the claimed subject matter, nor is it intended for use in determining the scope of the claimed subject matter.

Pairing service technologies is described. In embodiment(s), peripheral devices can be recognized or discovered, such as by a computer device, and a peripheral device can be configured with multiple services that each correspond to one or more data communication protocols. The multiple services of a peripheral device can be determined, and a pairing sequence can be prioritized for the multiple services. The data communication protocol(s) can then be paired according to the pairing sequence to configure the multiple services of the peripheral device.

In other embodiment(s) of pairing service technologies, the data communication protocols can be paired to configure a transport stack that enables use of the peripheral device. The data communication protocols are paired to provision, network, and/or associate the multiple services of the peripheral device. In an embodiment, the peripheral device can be discovered via a first data communication protocol, and then a second data communication protocol can be provisioned and networked for data communication with the peripheral device. In another embodiment, the peripheral device can be represented as a single entity on a user interface for user selection to initiate configuring the multiple services of the peripheral device.

BRIEF DESCRIPTION OF THE DRAWINGS

Embodiments of pairing service technologies are described with reference to the following drawings. The same numbers are used throughout the drawings to reference like features and components.

DETAILED DESCRIPTION

Embodiments of pairing service technologies provide that a peripheral device, such as a printer or computer device, that includes multiple services, devices, and/or components can be represented as a single entity on a user interface, even though the peripheral device includes the multiple services, devices, and/or components for configuration. The representation of the peripheral device as a single entity on a user interface provides that a user need only select the peripheral device once to configure all of the services, devices, and/or components to enable use of the device. In various embodiments, pairing of services technologies is implemented as a process to locate or discover the multiple services, devices, and/or components of peripheral devices; enumerate and prioritize pairing the various services, devices, and/or components; and implement the configuring, provisioning, and/or associating of the various services, devices, and/or components of the peripheral devices.

While features and concepts of the described systems and methods for pairing service technologies can be implemented in any number of different environments, systems, and/or various configurations, embodiments of pairing service technologies are described in the context of the following example systems and environments.

Figure 1:
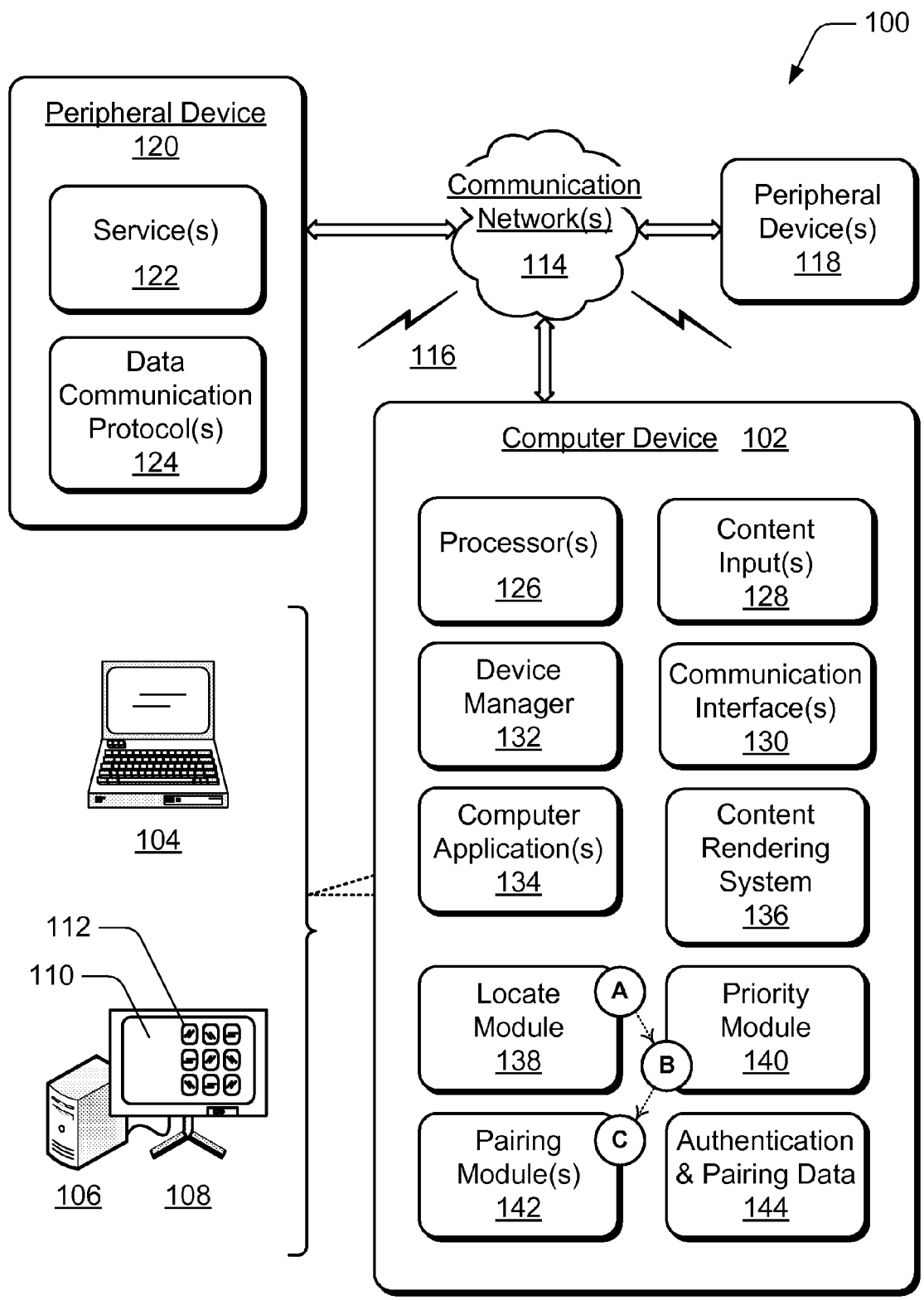
FIG. 1 illustrates an example system in which embodiments of pairing service technologies can be implemented.

FIG. 1 illustrates an example system 100 in which various embodiments of pairing service technologies can be implemented. Example system 100 includes a computer device 102 (e.g., a wired and/or wireless device), such as a portable computer 104, a desktop computer 106, or any combination of an ultra-mobile personal computer (UMPC), a mobile data phone (e.g., cellular, VoIP, Wi-Fi, etc.) that is implemented for data, messaging, and/or voice communications, an appliance device, an electronic device, and/or any other type of computer device that can receive, display, and/or communicate data in any form of audio, video, and/or image data.

A computer system can include desktop computer 106 and a display device 108 on which a user interface 110 can be displayed. In this example, the user interface 110 includes user interface elements and/or user-selectable controls 112, such as any type of image, graphic, text, selectable button, menu selection, map element, and/or any other type of user interface displayable feature or item. Any of the various computer devices described herein can be implemented with one or more processors, communication components, content inputs, memory components, storage media, signal processing and control circuits, and a media content rendering system. A computer device can also be implemented with any number and combination of differing components as described with reference to the example device shown in FIG. 3. A computer device may also be associated with a user (i.e., a person) and/or an entity that operates the device such that a computer device describes logical devices that include users, software, and/or a combination of devices.

Any of the computer devices can also be implemented for data communication via communication network(s) 114 that can include any type of a data network, voice network, broadcast network, an IP-based network, and/or a wireless network 116 that facilitates data, messaging, and/or voice communications. Computer device 102 can be communicatively linked to any number of peripheral devices 118, an example of which is peripheral device 120 that includes multiple services 122 that each correspond to one or more data communication protocols 124.

A peripheral device 120, such as a wireless printer, can include multiple services 122, such as for Wi-Fi communication, WLAN Protected Setup (WPS) for discovery and configuration of WLAN settings, and a printer setup for discovery and configuration of printer settings (e.g., when printing a document utilizes both Wi-Fi and the print configuration). The services 122 may also be referred to as devices, or components, of the peripheral device 120. A peripheral device can include multiple services, components, devices, functions, and/or functionality. The peripheral device 120 can be communicatively linked and accessible for use by computer device 102 over any of the various data communication protocols 124 that may be associated with transport technologies for USB, TCP/IP, BLUETOOTH, 802.11 a/b/g/n Wi-Fi, and the like.

In this example, computer device 102 includes one or more processors 126 (e.g., any of microprocessors, controllers, and the like), content input(s) 128 to receive media content, and communication interface(s) 130 for data, messaging, and/or voice communications associated with various data communication protocols. Media content (e.g., to include recorded media content) can include any type of audio, video, and/or image media content received from any media content source, such as television media content, music, video clips, data feeds, interactive games, network-based applications, and any other content. Computer device 102 also includes a device manager 132 (e.g., a control application, software application, signal processing and control module, code that is native to a particular device, a hardware abstraction layer for a particular device, etc.).

Computer device 102 can include various computer applications 134 (e.g., software applications, media applications, and the like) that can be processed, or otherwise executed, by the processors 126, such as a user interface application that generates the user interface 110 for display on display device 108. Computer device 102 also includes a content rendering system 136 that can render user interface 110 and/or generate a display on an external or integrated display of computer device 102.

In various embodiments, computer device 102 also includes a locate module 138, a priority module 140, and one or more pairing modules 142 that can each be implemented as computer-executable instructions and executed by the processors 126 to implement various embodiments and/or features of pairing service technologies. Although the locate module 138, priority module 140, and pairing modules 142 are each illustrated and described as separate modules, components, or program applications, the locate module 138, priority module 140, and pairing modules 142 can be implemented together as a single application program.

In various embodiments, pairing describes or includes configuring, provisioning, associating, and the like. Pairing can be implemented to enable a peripheral device to be communicatively linked or connected to another device over a transport technology associated with a data communication protocol. For example, two BLUETOOTH devices can pair by exchanging security keys to enable a protected and authenticated communication channel. In another example, a Wi-Fi device or service that is included as a component of a peripheral device can be paired with networking parameters so that the peripheral device can connect to a network. This provides that other network devices can communicate with the peripheral device.

In computer device 102, pairing can include horizontal and/or vertical pairing for inter-connected service technologies. Vertical pairing describes or includes a process of pairing each of the connectivity technologies that are associated with the data communication protocols 124 that complete a transport stack to enable use of the peripheral device 120. Horizontal pairing describes or includes a process of pairing services from more than one peripheral or computer device, where discovery and prioritization of services reveals a dependency to pair with other devices and/or services from another device.

In an implementation, pairing can include an exchange of a PIN to bootstrap a secure connection which can then be submitted for Wi-Fi configuration. In various embodiments, pairing of services technologies is implemented as a process to locate or discover services, devices, and/or components of peripheral devices (e.g., item A at locate module 138); enumerate and prioritize pairing the various services, devices, and/or components (e.g., item B at priority module 140); and implement the configuring, provisioning, and/or associating of the various services, devices, and/or components of the peripheral devices (e.g., item C at pairing modules 142).

In various embodiments, the locate module 138 can be implemented to discover peripheral devices 118, 120 that can be configured for data communication with computer device 102, such as a printer, a data phone, or another computer device. Also referred to as layered component discovery, the multiple services 122 (e.g., to include devices and/or components) of peripheral device 120 can be discovered or determined. The multiple services 122 can be determined from metadata about multiple transports in a single transport, or device type data. The different, multiple services 122 can be discovered or determined over different transports. For example, in-band metadata within the WPS protocol can indicate the type of component for Wi-Fi radio configuration, or Web Services layered on top of Wi-Fi devices using WPS.

In an embodiment, the full capabilities, functionality, and services of a peripheral device may not be initially known or discoverable by the locate module 138. A device or service may be initially discoverable via a first technology (and/or protocol), and after an exchange of security information and/or pairing with the first technology, additional capabilities, functionality, and services of the peripheral device become discoverable which may then initiate additional vertical and/or horizontal pairing.

When the multiple services 122 of peripheral device 120 are discovered, the peripheral device can be represented as a single entity on user interface 110 as one of the user interface elements and/or user-selectable controls 112, even though the peripheral device 120 includes multiple services 122 for pairing. The representation of the peripheral device 120 as a single entity on user interface 110 provides that a user can select the peripheral device once to configure all of the services, devices, and/or components via the one interface to enable use of the device over the various data communication protocols 124.

In various embodiments, the priority module 140 can be implemented to prioritize a pairing sequence for the multiple services 122 of the peripheral device 120 after the locate module 138 discovers the services, and when a user selects to initiate configuring the device. In an embodiment that includes horizontal pairing, the locate module 138 can discover the multiple services 122 of peripheral device 120, and the priority module 140 can then determine that use of a service 122 is dependent on a service at another device, such as a peripheral device 118. For example, the service 122 may utilize security tokens or certificates that are issued by a server on peripheral device 118. The metadata that links service 122 with a service at peripheral device 118 may be included with the service 122, stored on computer device 102, and/or can be stored and located elsewhere.

The priority module 140 can also receive authentication and/or pairing data 144 and utilize different sources to inform the pairing sequence, such as metadata transmitted by the peripheral device 120, a database of devices that utilize pairing, or heuristics that use device properties unrelated to pairing (e.g., driver class). The priority module 140 can determine which of the services, devices, and/or components of a peripheral device to enumerate and prioritize for a pairing sequence from multiple association graphing inter-connectivity that correlates vertical and/or horizontal pairing associations and the inter-connectivity of the data communication protocols 124 in a dependency graph.

The priority module 140 can enumerate the different layered components of a peripheral device, such as the services, devices, and/or components of peripheral device 120. The relevant metadata of each service 122 can be evaluated to prioritize a pairing sequence for the services. In an implementation, the metadata can be determined and passed to the priority module 140 in-band within the WPS protocol. The multiple services 122 (e.g., to include devices and/or components) can then be prioritized for a pairing sequence to provision and configure the services. For example, a Wi-Fi connection can be prioritized first and then a network configuration after an exchange of authentication and/or security certificates.

In various embodiments, the pairing modules 142 can each be implemented to pair the data communication protocols 124 according to the pairing sequence (e.g., as determined by the priority module 140) to configure the multiple services 122 of the peripheral device 120. The pairing modules 142 provision and network the data communication protocols to configure a transport stack that enables use of the multiple services 122 of the peripheral device 120.

Each pairing module 142 corresponds to a particular data communication protocol 124, and in an embodiment, the pairing modules 142 are implemented to interface and/or communicate configuration data for inter-connectivity when pairing the service technologies, such as when they are inter-related. In one embodiment, the pairing sequence occurs sequentially, one component pairing followed by the next. Alternatively, the different pairing processes are interrelated, such as when a secured channel is configured and utilized for a pairing process.

Example method 200 is described with reference to FIG. 2 in accordance with one or more embodiments of pairing service technologies. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 200 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 2:
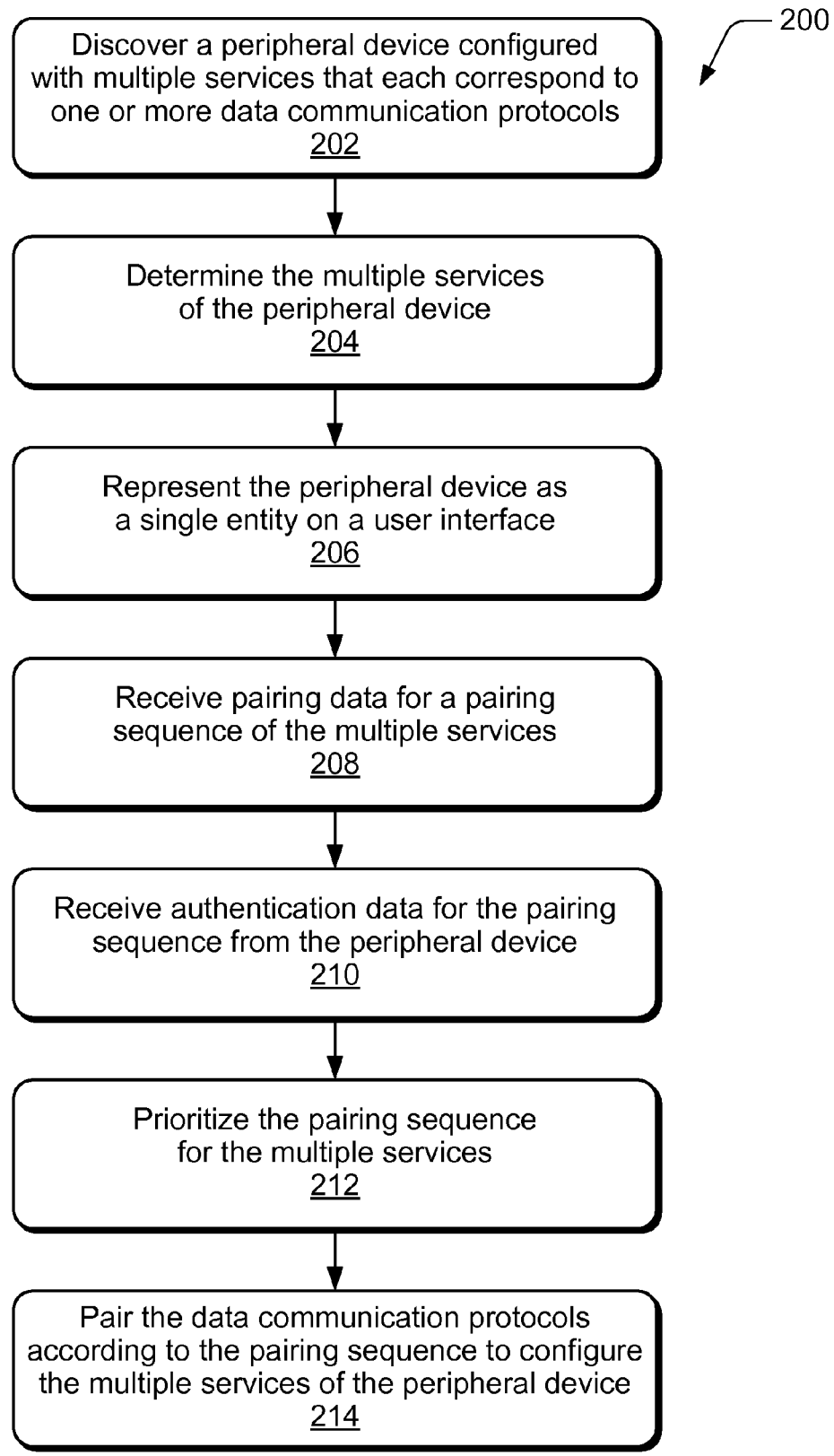
FIG. 2 illustrates example method(s) for pairing service technologies in accordance with one or more embodiments.

FIG. 2 illustrates example method(s) 200 of pairing service technologies. The order in which the method is described is not intended to be construed as a limitation, and any number of the described method blocks can be combined in any order to implement the method, or an alternate method.

At block 202, a peripheral device is discovered that is configured with multiple services that each correspond to one or more data communication protocols. For example, the locate module 138 at computer device 102 (FIG. 1) discovers peripheral devices 118, such as peripheral device 120 that includes multiple services 122 that each correspond to one or more data communication protocols 124. At block 204, the multiple services of the peripheral device are determined. For example, the locate module 138 at computer device 102 can also determine, or otherwise enumerate, the multiple services 122 that are included in the peripheral device 120. The locate module 138 can also determine that use of a service 122 at computer device 102 is dependent on a service at another device, such as a peripheral device 118.

At block 206, the peripheral device is represented as a single entity on a user interface. For example, when the multiple services 122 of peripheral device 120 are discovered, the peripheral device is represented as a single entity on user interface 110 as one of the user interface elements and/or user-selectable controls 112, even though the peripheral device 120 includes multiple services 122. The representation of the peripheral device on the user interface can be selected by a user to initiate configuring the multiple services of the peripheral device.

At block 208, pairing data for a pairing sequence of the multiple services is received and, at block 210, authentication data is received for the pairing sequence from the peripheral device. For example, priority module 140 at computer device 102 receives authentication and/or pairing data 144 and can utilize different sources to inform the pairing sequence, such as metadata transmitted by the peripheral device 120, a database of devices that utilize pairing, retrieved from the computer device if stored thereon, and/or heuristics that use device properties unrelated to pairing (e.g., driver class).

At block 212, the pairing sequence for the multiple services is prioritized. For example, the priority module 140 at computer device 102 prioritizes the pairing sequence for the multiple services 122 of the peripheral device 120 after the locate module 138 discovers the services, and when a user selects to initiate configuring the peripheral device.

At block 214, the data communication protocols are paired according to the pairing sequence to configure the multiple services of the peripheral device. For example, the pairing modules 142 at computer device 102 pair the data communication protocols 124 according to the pairing sequence (e.g., as determined by the priority module 140) to configure the multiple services 122 of the peripheral device 120. The pairing modules 142 provision and network the data communication protocols to configure a transport stack that enables use of the multiple services 122 of the peripheral device 120. In an embodiment, method 200 can be subsequently applied and repeated because the full capabilities, functionality, and services of a peripheral device may not be initially known or discoverable by the locate module 138, and the method can be repeated to discover (202), determine (204), prioritize (212), and pair (214) the multiple services and/or data communication protocols.

Figure 3:
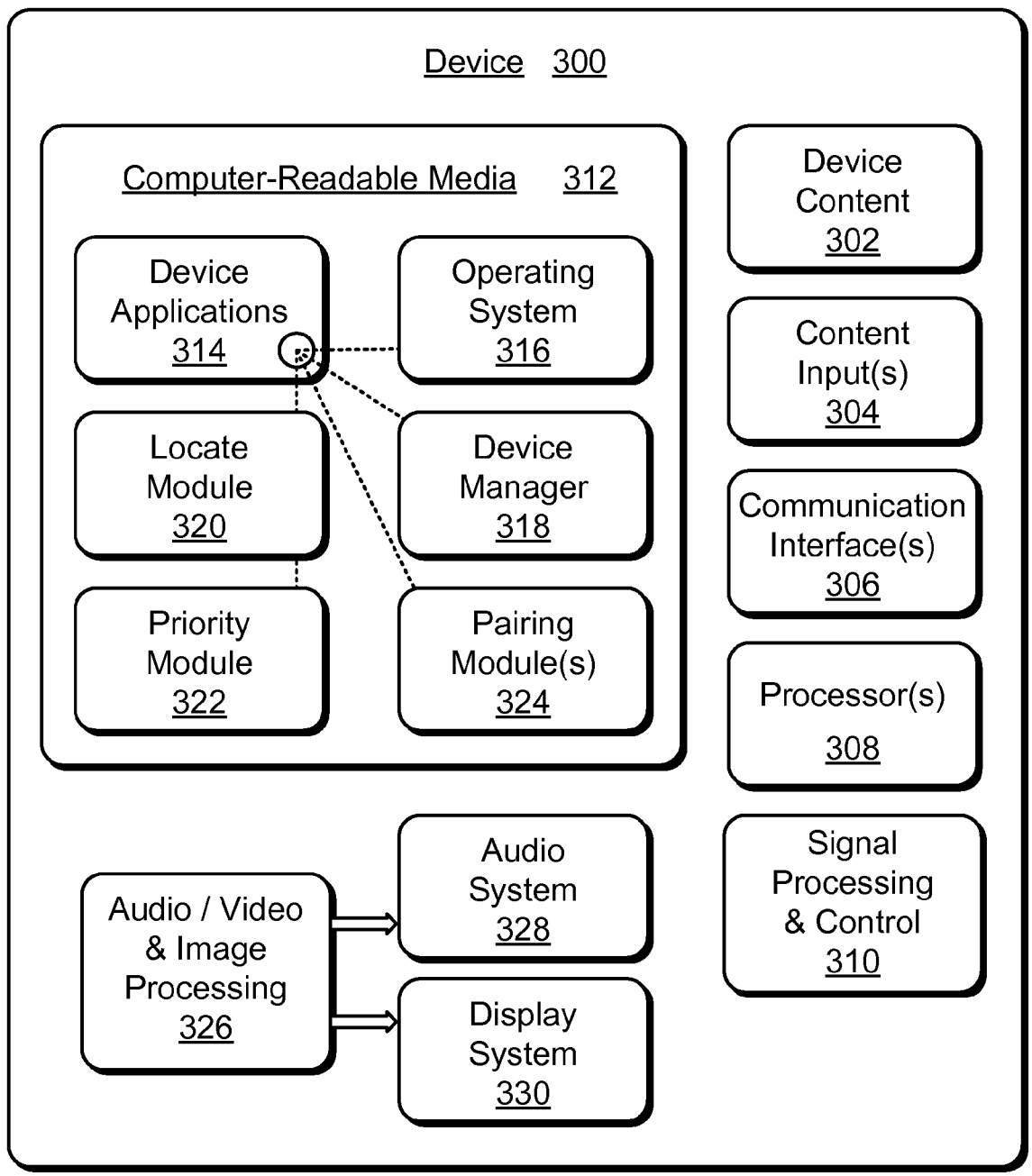
FIG. 3 illustrates various components of an example device that can implement embodiments of pairing service technologies.

FIG. 3 illustrates various components of an example device 300 that can be implemented as any form of a portable, computing, electronic, appliance, peripheral, and/or media device to implement various embodiments of pairing service technologies. For example, device 300 can be implemented as a computer device as described with reference to FIG. 1.

Device 300 can include device content 302, such as configuration settings of the device, media content stored on the device, information associated with a user of the device, authentication data, and/or pairing data utilized to determine a pairing sequence. Media content stored on device 300 can include any type of data as well as audio, video, and/or image media content. Device 300 can include one or more content inputs 304 via which data and/or content can be received. In an embodiment, the content inputs 304 can include Internet Protocol (IP) inputs over which streams of media content are received via an IP-based network.

Device 300 further includes one or more communication interfaces 306 that can be implemented as any one or more of a serial and/or parallel interface, a wireless interface, any type of network interface, a modem, and as any other type of communication interface for various data communication protocols. The communication interfaces 306 provide a connection and/or communication links between device 300 and a communication network by which other electronic, computing, and communication devices can communicate data with device 300.

Device 300 can include one or more processors 308 (e.g., any of microprocessors, controllers, and the like) which process various computer-executable instructions to control the operation of device 300 and to implement embodiments of pairing service technologies. Alternatively or in addition, device 300 can be implemented with any one or combination of hardware, firmware, or fixed logic circuitry that is implemented in connection with signal processing and control circuits which are generally identified at 310.

Device 300 can also include computer-readable media 312, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 312 provides data storage mechanisms to store the device content 302, as well as various device applications 314 and any other types of information and/or data related to operational aspects of device 300. For example, an operating system 316 can be maintained as a computer application with the computer-readable media 312 and executed on the processors 308. The device applications 314 can also include a device manager 318, a locate module 320, a priority module 322, and one or more pairing modules 324. In this example, the device applications 314 are shown as software modules and/or computer applications that can implement various embodiments of pairing service technologies.

Device 300 can also include an audio, video, and/or image processing system 326 that provides audio data to an audio system 328 and/or provides video or image data to a display system 330. The audio system 328 and/or the display system 330 can include any devices or components that process, display, and/or otherwise render audio, video, and image data. The audio system 328 and/or the display system 330 can be implemented as integrated components of the example device 300. Alternatively, audio system 328 and/or the display system 330 can be implemented as external components to device 300. Video signals and audio signals can be communicated from device 300 to an audio device and/or to a display device via an RF (radio frequency) link, S-video link, composite video link, component video link, DVI (digital video interface), analog audio connection, or other similar communication link.

Although not shown, device 300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of pairing service technologies have been described in language specific to features and/or methods, it is to be understood that the subject of the appended claims is not necessarily limited to the specific features or methods described. Rather, the specific features and methods are disclosed as example implementations of pairing service technologies.

The invention claimed is:

1. A method, comprising:
 discovering a peripheral device configured with multiple services that each correspond to one or more data communication protocols;
 determining the multiple services of the peripheral device;
 prioritizing a pairing sequence for the multiple services; and
 pairing the one or more data communication protocols according to the pairing sequence to configure the multiple services of the peripheral device.

2. A method as recited in claim 1, wherein the one or more data communication protocols are paired to configure a transport stack that enables use of the peripheral device.

3. A method as recited in claim 1, wherein pairing the one or more data communication protocols includes provisioning and networking the multiple services of the peripheral device.

4. A method as recited in claim 1, further comprising retrieving pairing data to prioritize the pairing sequence.

5. A method as recited in claim 1, further comprising receiving pairing data for the pairing sequence from the peripheral device.

6. A method as recited in claim 1, further comprising receiving authentication data for the pairing sequence from the peripheral device.

7. A method as recited in claim 1, further comprising representing the peripheral device as a single entity on a user interface for user selection to initiate configuring the multiple services of the peripheral device.

8. A method as recited in claim 1, wherein the peripheral device is discovered via a first data communication protocol, and a second data communication protocol is provisioned and networked for data communication with the peripheral device.

9. A computer device, comprising:
one or more processors configured to process computer-executable instructions stored on computer-readable media;
a locate module stored on the computer-readable media and executable by the one or more processors to discover peripheral devices capable of being configured for data communication with the computer device, a peripheral device configured with multiple services that each correspond to one or more data communication protocols;
a priority module stored on the computer-readable media and executable by the one or more processors to prioritize a pairing sequence for the multiple services; and
one or more pairing modules stored on the computer-readable media and executable to pair the one or more data communication protocols according to the pairing sequence to configure the multiple services of the peripheral device.

10. A computer device as recited in claim 9, wherein the one or more pairing modules are further configured to pair the one or more data communication protocols to configure a transport stack that enables use of the peripheral device.

11. A computer device as recited in claim 9, wherein the one or more pairing modules are further configured to provision and network the one or more data communication protocols to configure the multiple services of the peripheral device.

12. A computer device as recited in claim 9, wherein the priority module is further configured to retrieve pairing data to prioritize the pairing sequence.

13. A computer device as recited in claim 9, wherein the priority module is further configured to receive pairing data for the pairing sequence from the peripheral device.

14. A computer device as recited in claim 9, wherein the priority module is further configured to receive authentication data for the pairing sequence from the peripheral device.

15. A computer device as recited in claim 9, wherein the locate module is further configured to discover the peripheral device via a first data communication protocol, and wherein the one or more pairing modules are further configured to provision and network a second data communication protocol for data communication with the peripheral device.

16. One or more computer-readable media comprising computer-executable instructions that, when executed, initiate a computer device to:
discover a peripheral device configured with multiple services that each correspond to one or more data communication protocols;
determine the multiple services of the peripheral device;
prioritize a pairing sequence for the multiple services; and
pair the one or more data communication protocols according to the pairing sequence to configure the multiple services of the peripheral device.

17. One or more computer-readable media as recited in claim 16, further comprising computer-executable instructions that, when executed, initiate the computer device to pair the one or more data communication protocols to configure a transport stack that enables use of the peripheral device.

18. One or more computer-readable media as recited in claim 16, further comprising computer-executable instructions that, when executed, initiate the computer device to pair the one or more data communication protocols to provision and network the multiple services of the peripheral device.

19. One or more computer-readable media as recited in claim 16, further comprising computer-executable instructions that, when executed, initiate the computer device to request pairing data to prioritize the pairing sequence.

20. One or more computer-readable media as recited in claim 16, further comprising computer-executable instructions that, when executed, initiate the computer device to request authentication data for the pairing sequence.

* * * * *